United States Patent [19]

Steer

[11] Patent Number: 5,007,239

[45] Date of Patent: Apr. 16, 1991

[54] MASTER CYLINDER WITH SANDWICHED COMMUNICATION INTERFACES

[75] Inventor: John E. Steer, South Bend, Ind.

[73] Assignee: Allied-Signal Inc., Morristown, N.J.

[21] Appl. No.: 449,196

[22] Filed: Dec. 12, 1989

[51] Int. Cl.$^5$ .................. B60T 11/20; B60T 11/232; B60T 11/236; B60T 11/28

[52] U.S. Cl. .......................... 60/562; 60/585; 60/588; 92/163; 92/169.1

[58] Field of Search ............... 60/533, 562, 585, 588; 92/163, 169.1, 170.1, 171.1

[56] References Cited

U.S. PATENT DOCUMENTS

| | | | |
|---|---|---|---|
| 4,685,300 | 8/1987 | Steer | 92/170.1 X |
| 4,718,234 | 1/1988 | Steer | 60/562 |
| 4,793,139 | 12/1988 | Reynolds | 60/585 X |

Primary Examiner—John T. Kwon
Assistant Examiner—George Kapsalas
Attorney, Agent, or Firm—Larry J. Palguta; Ken C. Decker

[57] ABSTRACT

The master cylinder (10) comprises a front or first housing part (12) which is generally U-shaped and a second or rear housing part (14) which is also generally U-shaped, the second housing part (14) being received within an end opening of the first housing part (12). The second housing part (14) has an end opening (16) opposite the first housing part (12) through which a first piston (18) is received. The first piston (18) and a second piston (22) are biased by respective resilient mechanisms (20, 24) disposed within a bore (26) defined by the parts (12, 14). Captured between the first and second housing parts (12, 14) are first and second interface members (80, 90) which have seals insert molded thereon. The first and second housing parts (12, 14) are held together by self-threading screws (100) such that a predetermined clamp load is imposed upon the interface members (80, 90). The master cylinder (10) has outlets (34, 36) all of which are oriented longitudinally toward the fron of the master cylinder. A reservoir (40) is captured between a wall member (50) and the interface members (80, 90) and front housing part 12) so that the reservoir (40) remains in place. The master cylinder (10) may be attached by a screw and nut mechanism (17) to the wall member (50).

22 Claims, 7 Drawing Sheets

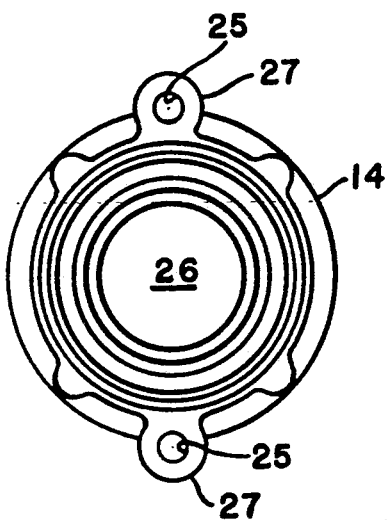
FIG. 3
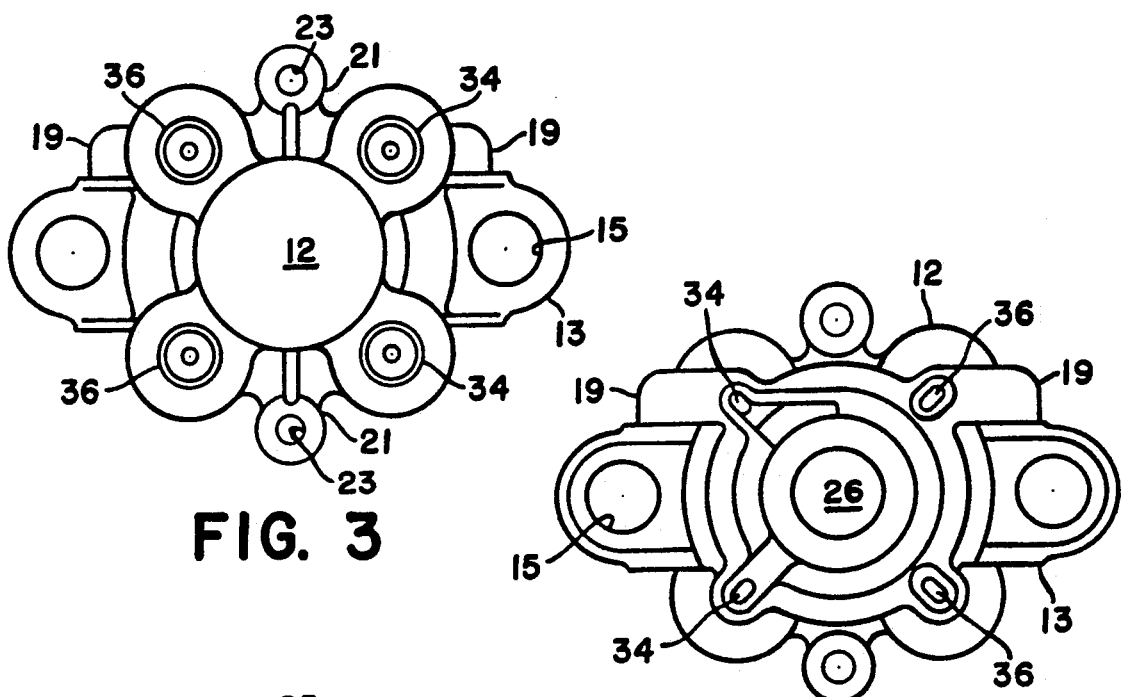
FIG. 4
FIG. 5
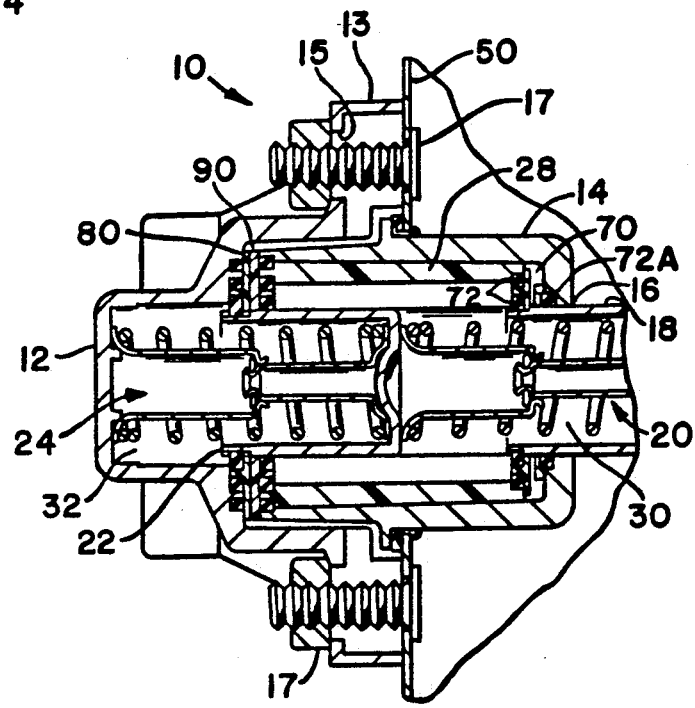
FIG. 6

MASTER CYLINDER WITH SANDWICHED COMMUNICATION INTERFACES

BACKGROUND OF THE INVENTION

The present invention relates generally to a master cylinder, and in particular to a master cylinder having a pair of interface members sandwiched between two housing parts connected together.

The invention concerns a type of master cylinder known generally as a recessed cartridge master cylinder and disclosed in U.S. Pat. No. 4,718,234. The master cylinder includes two die cast components one of which is threaded into the other. The assembly of the two die cast components is sensitive to assembly torque. The assembly torque directly affects the master cylinder function due to the compression set of the plastic components which could possibly close off the pumping flow ports even though they were open during production testing. The male/female threads of the two die cast components have very tight tolerances which are required in order to orient the internal components with respect to concentricity. During assembly, several individual seal components must be oriented during assembly. The assembly and function of the seals is sensitive to diametric fit, roundness, and concentricity of several components. The outlet ports extend to the side and this dictates the location and orientation of a fluid level indicator within the reservoir in addition to the shape of the reservoir in order to permit access for tools which receive the brake line tube nuts. The reservoir is typically held to the housing by means of a wire retainer. Because of the shape of the die cast housing, the die utilized results in a limited number of cavities. These can be difficult to maintain since the diameters are large. It is highly desirable to eliminate or mitigate a large number of the above problems while still providing a very short recessed cartridge type of master cylinder which provides a significant reduction in packaging space under the hood of an automotive vehicle. Such packaging space has become important with the advent of adaptive braking control systems which can require considerable space within the vehicle motor area.

SUMMARY OF THE INVENTION

The present invention provides solutions to the above problems by providing a master cylinder, comprising a first housing part and a second housing part and having an end of one part received at the end of the other part so that the parts define therebetween an interior opening comprising a bore, a sleeve member received within said second housing part, first piston means slideably received within an end opening of said second part, second piston means received within said bore and biased by first resilient means, second resilient means disposed between said pistons, a reservoir communicating with said bore, and first and second interface members captured between said first and second parts, the interface members having sealing members molded thereupon to provide fluid flow paths between the reservoir and bore and between said bore and fluid outlets.

BRIEF DESCRIPTION OF THE DRAWINGS

One way of carrying out the invention is described in detail below with reference to the drawings which illustrate an embodiment in which:

FIG. 3 is an end view of first housing part of the master cylinder;

FIG. 4 is an interior view of the first housing part;

FIG. 5 is an interior view of the second housing part;

FIG. 6 is a section view of the master cylinder attached to the vacuum brake booster;

DETAILED DESCRIPTION OF THE PREFERRED EMBODIMENT

Figure 1:
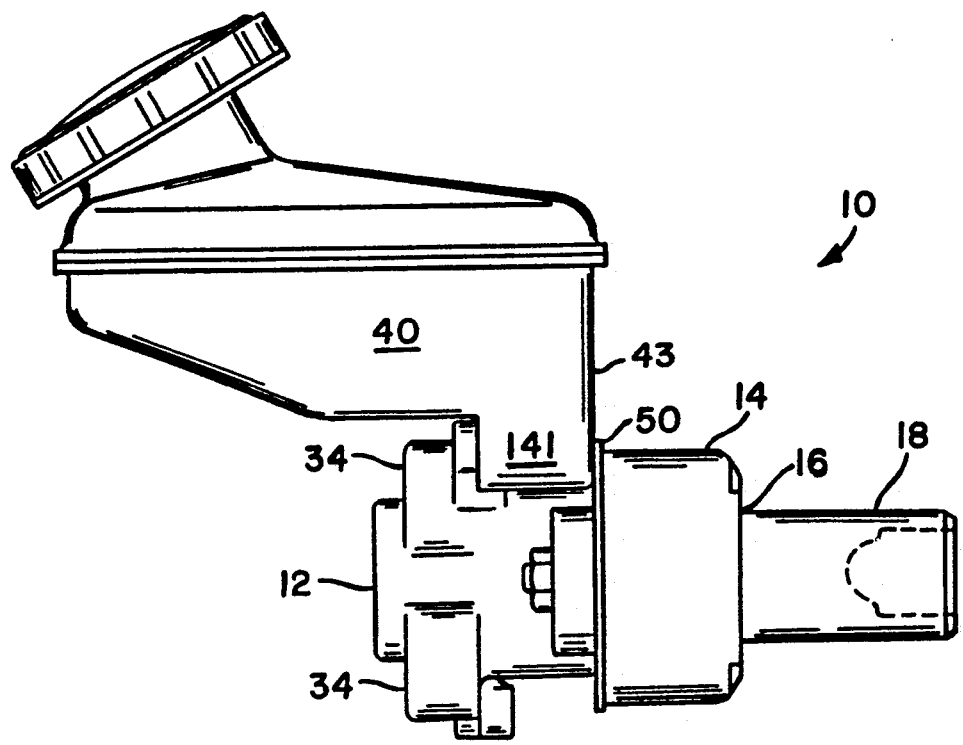
FIG. 1 is a side view of the master cylinder of the present invention.

The master cylinder of the present invention is designated generally by reference numeral 10 in FIG. 1. Master cylinder 10 includes a first or front housing part 12 and a second or rear housing part 14. Housing part 14 has an end opening 16 receiving therein first piston means 18. First piston means 18 is biased by a resilient assembly 20 (see FIG. 6) located between first piston means 18 and second piston means 22. Second piston means 22 is biased by a resilient assembly 24. Together, the housing parts 12 and 14 define an interior opening which comprises a master cylinder bore 26. As disclosed in U.S. Pat. No. 4,718,234 incorporated by reference herein, the second housing part includes a sleeve member 28 which permits fluid flow between the sleeve member and second housing part 14 to the primary pressure chamber 30. The primary pressure chamber 30 transmits fluid pressure to primary outlet ports 36 (see FIG. 2). The secondary pressure chamber 32 transmits fluid pressure to secondary outlet ports 34. A reservoir 40 includes secondary and primary reservoir ports 141 and 142, respectively, which are received at receiving ports of a second interface member. The master cylinder includes a wall member 50 (FIG. 1) which may be attached separately to master cylinder 10, or comprise a firewall, or comprise the wall of a booster device. The wall member 50 engages the rear wall 43 of reservoir 40 so that reservoir 40 is captured between wall member 50 and first housing part 12.

Figure 2:
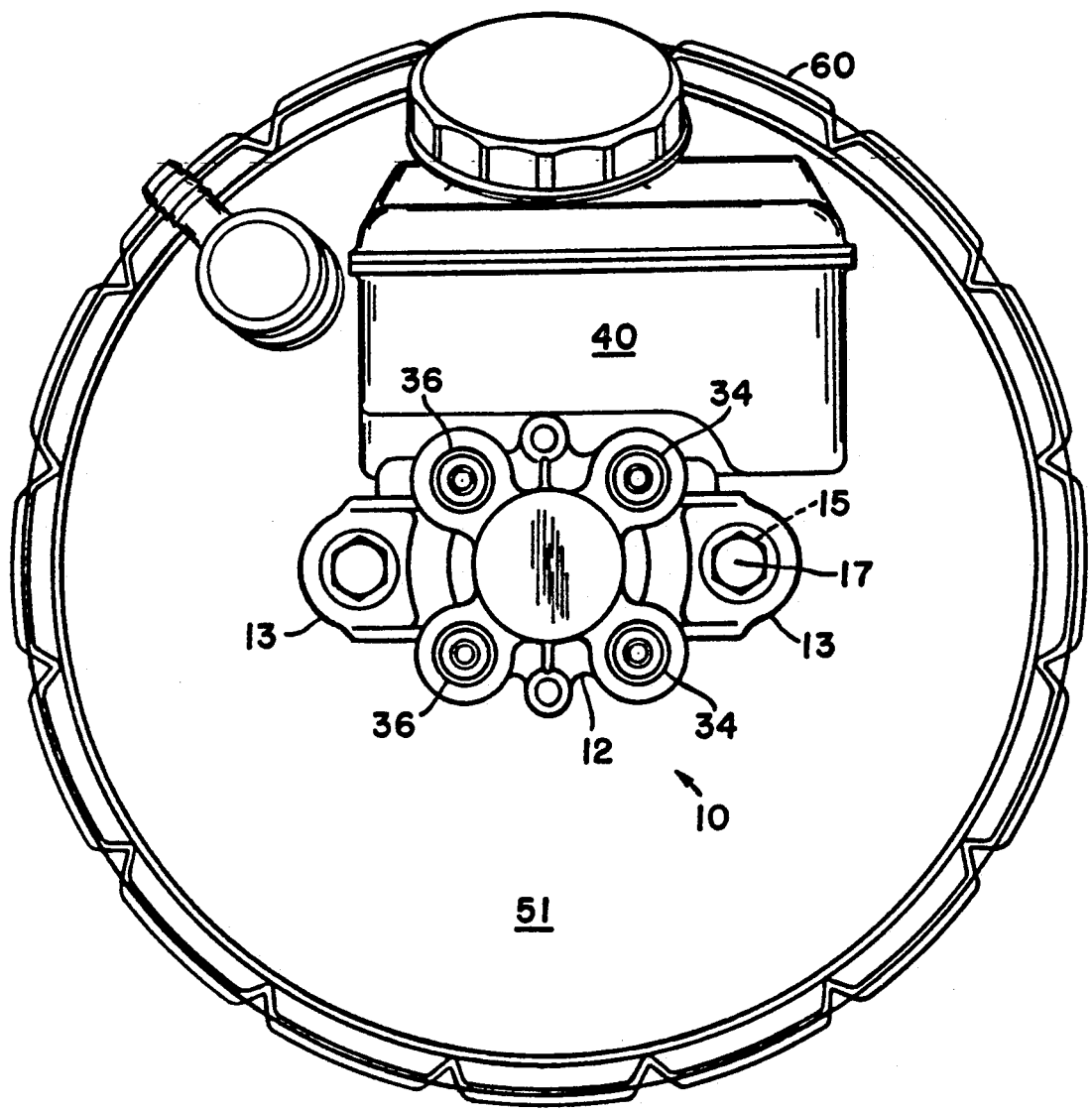
FIG. 2 is an end view of the master cylinder of the present invention and attached to a vacuum brake booster.

Referring to FIG. 2, master cylinder 10 is shown attached to a vacuum brake booster 60. The primary and secondary outlet ports 36, 34 are all oriented longitudinally toward the front of the master cylinder so that the brake line tube nuts are easily coupled therewith. The first housing part 12 includes flanges 13 having openings 15 which receive therein screw and nut mechanisms 17. The screw and nut mechanisms engage the front shell or wall member 51 of vacuum brake booster 60 in order to attach thereto master cylinder 10.

Figure 7:
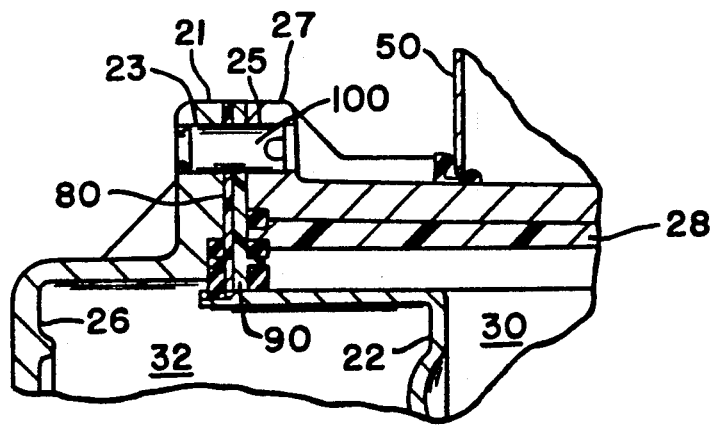
FIG. 7 is a section view of the connection between the first and second housing parts.

Referring to FIG. 3, the master cylinder will be described in greater detail. Some section views are taken at various angles in order to illustrate the fluid flow paths. FIG. 3 illustrates a front end view of the first housing part 12 of the master cylinder illustrated in FIGS. 1 and 2. Housing part 12 includes radially extending wall sections 19 which, in conjunction with any type of rear wall means as disclosed above, assists in capturing and holding the reservoir in position. Radial wall extensions 21 include non-threaded openings 23 which will be described in detail below. The primary outlet ports 36 are threaded as are secondary outlet ports 34. Referring to FIG. 4, the reverse side or interior side of first housing part 12 is illustrated. The interior opening or bore 26 communicates with the secondary outlet ports 34, and the primary outlet ports 36 comprise openings which will communicate with the primary pressure chamber that is located in the central-to-rear portion of the master cylinder. FIG. 5 illustrates the interior of second housing part 14 which is generally concentric with first housing part 12 and includes therein a portion of bore 26. Housing flanges 27 include non-threaded openings 25 which will be discussed in detail below. FIG. 6 is a section view of the entire master cylinder shown attached to a wall member 50. Subsequent section views have deleted the resilient assemblies 20 and 24 in order to make the drawings more clearly understandable. As described above, wall member 50 may comprise a separate wall member, firewall, or the front wall of a booster housing. The screw and nut mechanisms 17 attach master cylinder 10 to wall member 50 by means of the housing flanges 13. First housing part 12 is generally "U" shaped and receives therein second housing part 14. Second housing part 14 includes the sleeve member 28 which has at one end a primary land 70 with sealing members 72 insert molded thereon. Second housing part 14 includes the rear opening 16 which receives slideably the primary piston 18. A sealing member 72 engages the primary piston 18 in order to retain fluid within the primary chamber 30. The seal and primary land assembly are constructed essentially the same as in prior recessed cartridge master cylinders, with the exception that the seals are insert-molded onto the land member rather than being separate components. However, the rear seal 72A may be alternatively manufactured separately from land 70 and seals 72. The secondary piston 22 defines with housing first part 12 a secondary pressure chamber 32. Secondary piston 22 at one end engages seals which are mounted upon first interface member 80 and second interface member 90. The interface members 80, 90 are sandwiched or captured between the first and second housing parts and between the first housing part and sleeve member 28. When first and second housing parts 12 and 14 are assembled together with all of the other interior components of the master cylinder located therein, the housing parts are held together by means of self-threading screws 100 which are illustrated in FIG. 7. Self-threading screws 100 are received within unthreaded openings 23 and 25 of extensions 21 and 27. When the components have been stacked and fitted together via an appropriate assembly procedure, a clamp load is maintained by a holding fixture and the self-threading screws 100 inserted within the openings 23 and 25 so that the second and first housing parts are held together at a fixed clamp load. The interfaces 80 and 90 are captured or sandwiched between the first and second housing parts as shown in FIG. 7.

Figure 8:
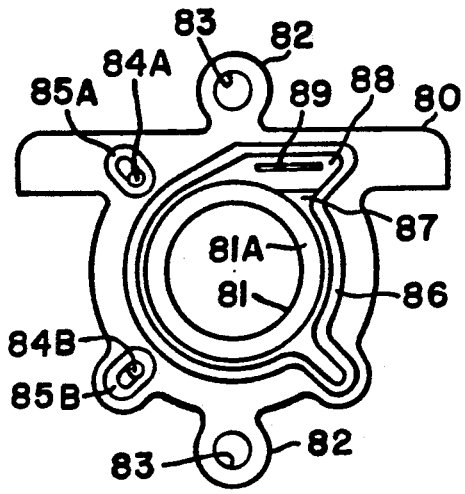
FIG. 8 is a front view of the first interface member.
Figure 9:
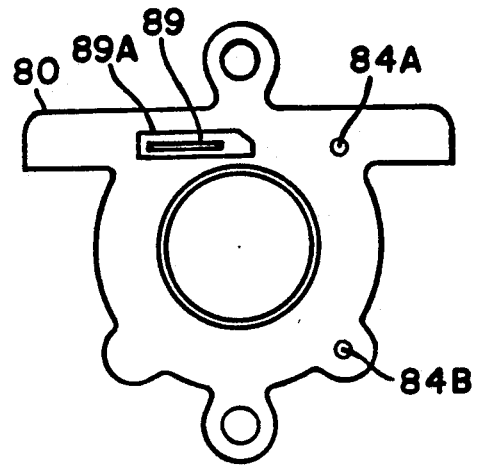
FIG. 9 is a reverse or rear view of the first interface member.

Referring to FIGS. 8 and 9, the first interface member 80 is illustrated in detail. First interface member 80 comprises a plastic member which has resilient sealing members insert molded thereupon. Member 80 includes an interior opening 81 bounded by seal 81A which defines a portion of bore 26. Flanges 82 include openings 83 for the self-threading screws 100. FIG. 8 is a front view of interface member 80, as viewed when looking at the front of the master cylinder illustrated in FIGS. 2 and 3. Comparing FIGS. 8 and 3, it can be seen that interface openings 84A, 84B are located within seal members 85A, 85B for the primary outlets 36. Correspondingly, the seal member 86 provides an enclosed flow path area 87 oriented with the secondary outlets 34. Seal member 86 includes a recessed interior seal pad 88 which includes a slot opening 89. Slot opening 89 permits fluid flow between the front and rear sides of interface member 80. FIG. 9 illustrates the reverse or back side of interface member 80. The openings 84A, 84B for the primary outlet ports 36 are shown. Interface member 80 includes a longitudinal opening 89A which exposes the slot opening 89. Longitudinal opening 89A will permit a protruding portion 89B of the second interface member 90 to extend into opening 89A and engage the perimeter of slot opening 89 to provide a secondary pumping zone for the secondary pressure chamber 32.

Figure 10:
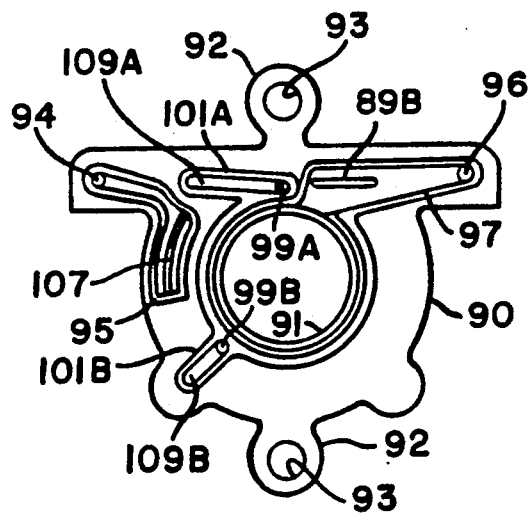
FIG. 10 is a front view of the second interface member.
Figure 11:
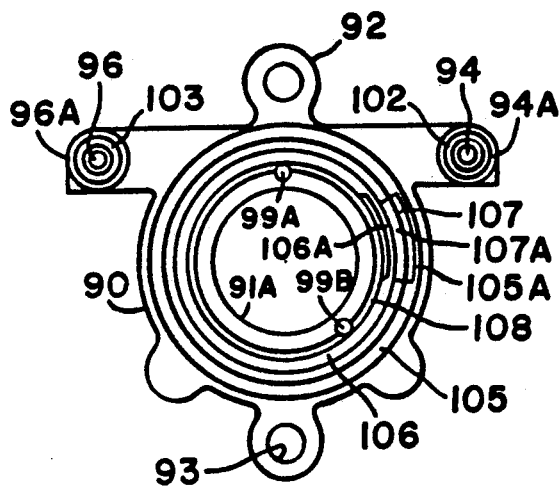
FIG. 11 is a reverse or rear view of the second interface member.

Referring to FIGS. 10 and 11, the second interface member 90 is illustrated in a front view in FIG. 10 which corresponds to the front views of FIGS. 2 and 3, and a rear or reverse view of interface member 90 is FIG. 11. It should be noted that the interfaces 80 and 90 abut each other when they are captured or sandwiched between the housing parts 12 and 14. Thus, FIGS. 8 and 10 provide front views of the two interface members, and FIGS. 9 and 11 provide reverse or rear views of the two interface members. FIG. 10 illustrates second interface member 90 which provides an interior opening 91 that defines a portion of bore 26. Extensions 92 provide openings 93 for the self-threading screws 100. Interface opening 94 provides an inlet opening for a primary inlet port 142 (FIG. 14) of the reservoir 40. Seal member 95 provides a sealed pathway so that fluid can flow from the primary inlet port to the primary chamber 30 of master cylinder 10. Likewise, opening 96 permits fluid to flow from a secondary reservoir inlet port 141 (FIG. 12) to secondary pressure chamber 32 via a seal member 97 which provides a sealed pathway. Member 90 includes an axially extending abutment 89B which, when compared with FIG. 8, can be seen to extend through the opening 89A of first interface member 80 and engage the slot opening 89. Second interface member 90 includes primary outlet openings 99A and 99B which communicate with the seals 101A and 101B in order to permit fluid to flow to the primary outlet ports 36 illustrated in FIG. 3. The seals 101A and 101B provide sealing pathways for fluid flow to the respective outlet ports. FIG. 11 shows the reverse or back side of second interface member 90 wherein a seal member 102 within interface receiving port 94A is provided adjacent opening 94 so that fluid may flow from the primary inlet port 142 of the reservoir 40. Seal member 103 within interface receiving port 96A provides a sealed pathway to opening 96 so that fluid may be communicated from the reservoir 40 via the secondary inlet port 141. The seal members 105 and 106 have respective thinned areas 105A and 106A, area 106A being part of the primary pumping zone for primary pressure chamber 30 of the master cylinder. Thinned area 105A provides a flow path between sleeve extension 28A (FIG. 15) and the seal 105. Area 105A is adjacent the through opening 107 in member 90. Adjacent opening 107 is relieved area 107A which permits pumping fluid flow. Inner diameter seal 91A engages secondary piston 22 and the inside edge of the seal extends radially slightly past the edge of opening 91 as can be seen in FIG. 15.

Figure 12:
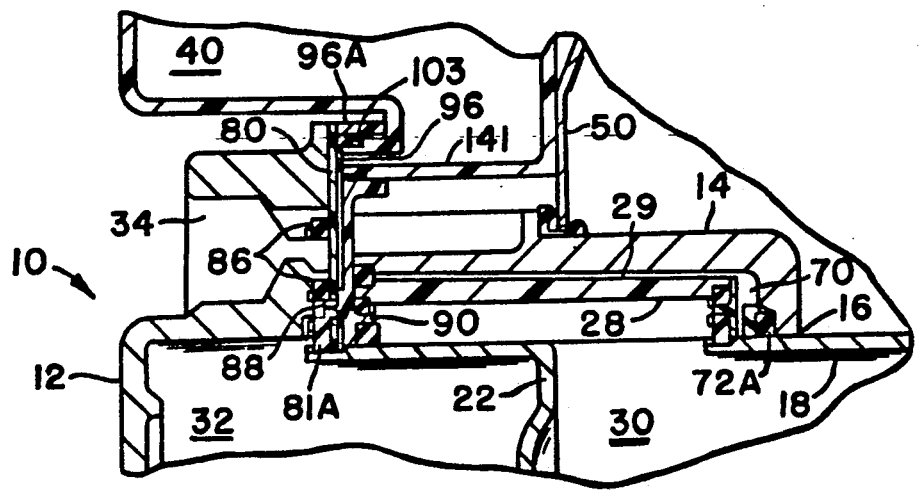
FIG. 12 is a section view illustrating the flow path between the secondary reservoir port and the master cylinder secondary chamber.
Figure 12A:
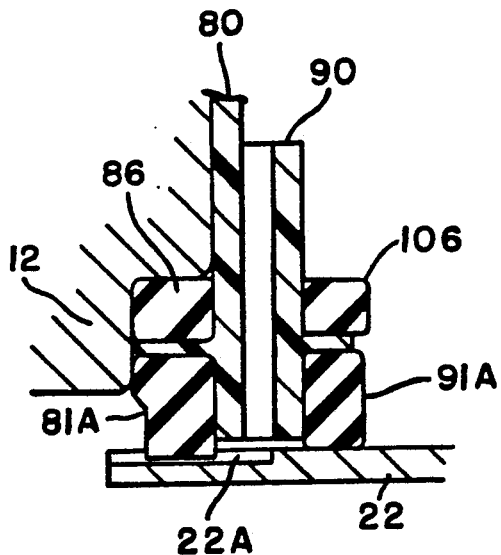
FIG. 12a is an enlarged partial section view of the secondary compensation path.
Figure 13:
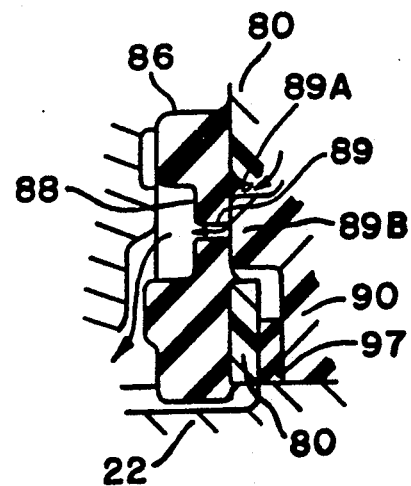
FIG. 13 is an enlarged view of the secondary pumping zone illustrated in FIG. 12.

Referring to FIG. 12, there is illustrated in section view the secondary reservoir inlet port 141 and its communication with the second pressure chamber 32 of master cylinder 10, and FIG. 12A is an enlarged partial section view of the compensation path. FIG. 13 comprises an enlarged partial section view of FIG. 12. First interface member 80 abuts in part second interface member 90. Second interface member 90 includes the seal 103 at inlet opening 96 and which is disposed about secondary reservoir inlet port 141 to effect sealing therebetween. First interface member 80 includes the interior seal 81A which engages the end of secondary piston 22 to define a portion of the secondary pressure chamber 32. Referring also to FIG. 12A, the compensation flow path is from reservoir inlet port 141 through opening 96, and along a flow way bounded by seal 97 to communicate directly with the secondary chamber 32 by means of the piston groove 22A. Seal 86 (see FIG. 8) defines a part of the pumping flow path between the secondary reservoir inlet port 141 and secondary pressure chamber 32. The seal pad 88 (see FIGS. 8 and 13) includes the slot opening 89 which is part of the flow path. Second interface member 90 includes the axial abutment or protrusion 89B (FIG. 10) which extends through the longitudinal opening 89A of first interface member 80 to seal selectively the slot opening 89. As illustrated in detail in FIG. 13, the longitudinal abutment 89B engages the perimeter of opening 89 of seal pad 88 such that pumping fluid flow may be provided between reservoir 40 (FIG. 12) and secondary chamber 32 as shown by the arrows, when the secondary piston 22 is returning toward an at rest position. During pressurization movement of the secondary piston 22 when the pressure in the secondary pressure chamber 32 is increasing, reverse flow is not permitted because during operation of the master cylinder the higher pressure in secondary chamber 32 will force the perimeter of seal pad 88 against the abutment 93 to close off the fluid flow path to the reservoir.

Figure 14:
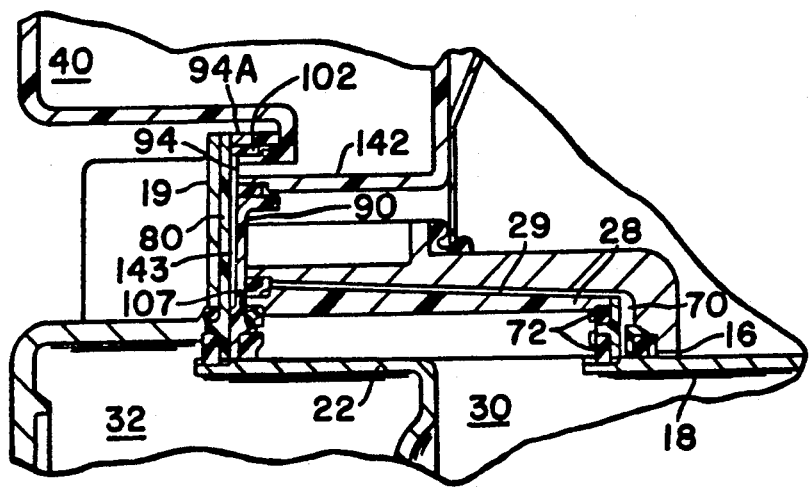
FIG. 14 is a section view of the primary reservoir port and flow path to the primary chamber of the master cylinder.
Figure 15:
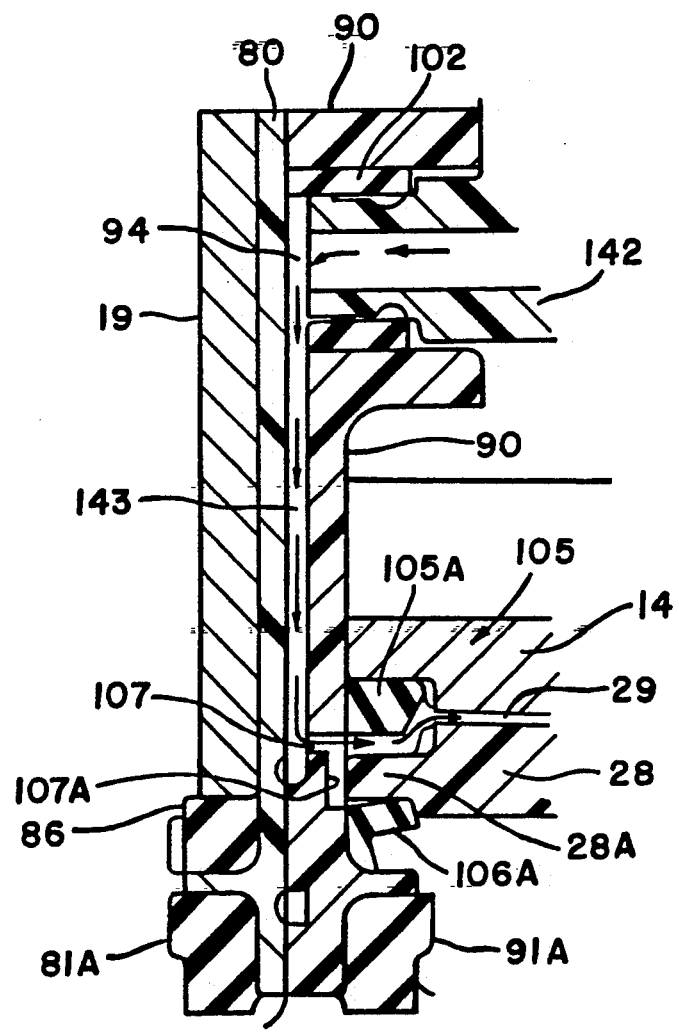
FIG. 15 is an enlarged section view of the primary reservoir port connection, the flow path to the primary chamber, and the primary pumping zone illustrated in FIG. 14.

FIGS. 14 and 15 illustrate in detail the communication path for the primary reservoir port. Reservoir 40 includes a primary reservoir port 142 which engages sealingly the seal 102 of second interface member 90. Fluid may flow between port 142 and inlet opening 94 of second interface 90. A flow path 143 exists between interface members 80 and 90. Second interface member 90 includes the circumferential opening 107 which permits fluid to flow from path 143 to compensation longitudinal flow path 29 between second housing part 14 and sleeve member 28. Circumferential opening 107 is located between the thinned seal areas 105A and 106A. The sleeve 28 includes a sleeve end extension 28A which is received between seal areas 105A, 106A. Thus, for compensation purposes fluid may flow from primary inlet port 142 through opening 94 in second interface member 90, through flow path 143 and back through second interface member 90 by means of opening 107 which communicates with the longitudinal pathway 29. The closing off of compensation longitudinal flow path 29 is effected by the end of piston 18 moving past the seals 72 and land 70 adjacent opening 16 of second housing part 14. However, for primary pressurization purposes, the seal 106 comprises a movable seal member which, when pressure within primary pressure chamber 30 increases, permits thinned seal area 106A to tightly engage the sleeve extension 28A (FIG. 15) and prevent fluid flow into pathway 143 and reservoir 40. However, when fluid is needed within primary pressure chamber 30 during release movement of primary piston 18, fluid may flow from pathway 143 past flexible area 106A which disengages the extension 28A. The relieved area 107A provides a pathway for pumping fluid flow between extension 28A and member 90.

Figure 16:
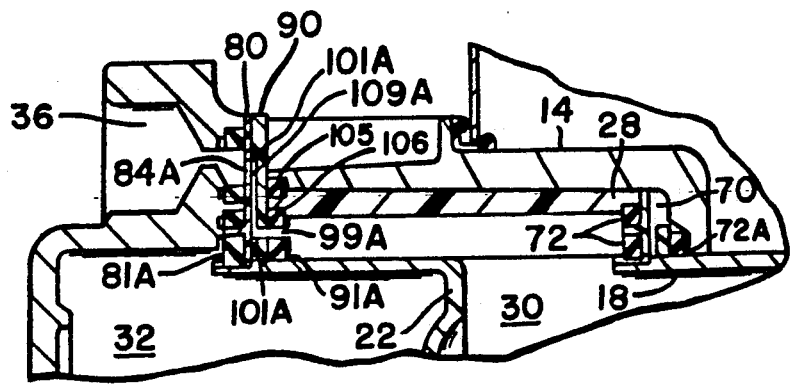
FIG. 16 is a section view of the flow path for a primary outlet port.

FIG. 16 illustrates a section view of the flow path to a primary outlet port 36. First interface member 80 includes the primary outlet openings 84A, 84B (see FIG. 8) enclosed by the seals 85A, 85B, respectively. Second interface member 90 includes the seal 101A (see FIG. 10) which communicates with the primary outlet opening 99A, and seal 101B which communicates with primary outlet opening 99B. The opposite side of second interface member 90 (see FIG. 11) includes the seals 91A, 106 and 105. Located between seals 91A and 106 is the primary outlet flow path 108 on second interface member 90. Path 108 communicates the primary pressure chamber 30 of master cylinder 10 with outlet openings 99A, 99B, thereby providing fluid flow paths via pathways 109B (see FIG. 10) to primary outlet ports 36. The flow path is from primary pressure chamber 30 to path 108, through openings 99A, 99B, along pathways 109A, 109B, and through openings 84A, 84B to the areas bounded by seals 85A, 85B and to ports 36.

Figure 18:
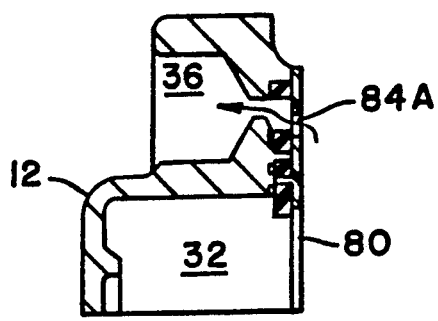
FIG. 18 is a section view of the primary outlet port and first interface member of FIG. 17 after assembly.
Figure 17:
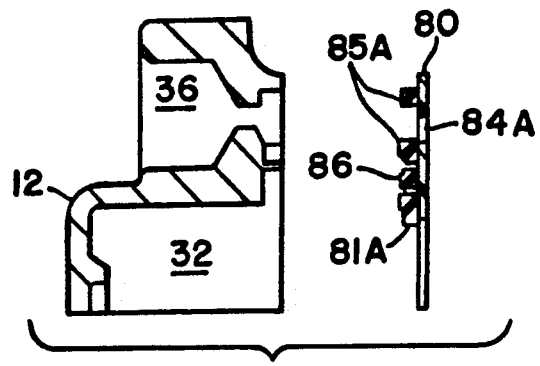
FIG. 17 is an illustration of the first interface member and a primary outlet port prior to assembly.
Figure 20:
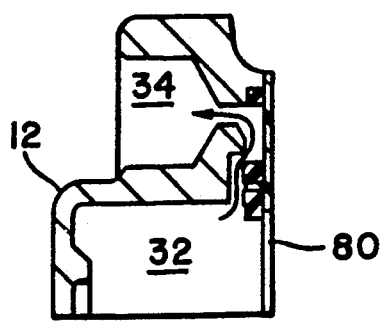
FIG. 20 is a section view of the secondary outlet port and first interface member after assembly.
Figure 19:
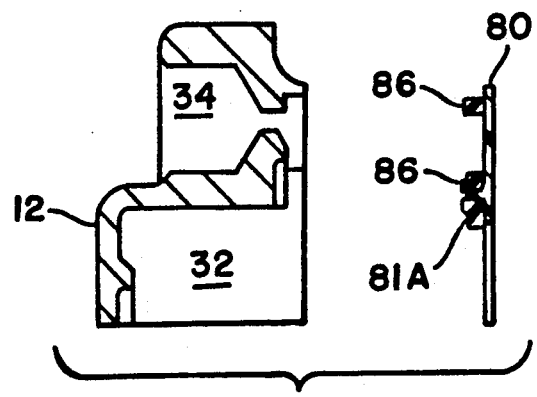
FIG. 19 is a section view of a secondary outlet port and the first interface member prior to assembly.

FIGS. 17 and 18 illustrate the assembly of the first interface member 80 and the first housing part 12 at a primary outlet port 36. The seals 81A, 86 and 85A are insert molded on first interface member 80 when it is manufactured. During assembly, first interface member 80 is coupled with first housing part 12 so that opening 84A in member 80 provides a communication flow path via the arrow illustrated in FIG. 18. Likewise, FIGS. 19 and 20 illustrate the assembly of the first interface member 80 with first housing part 12 to provide a flow path to a secondary outlet port 34. First interface member 80 includes the seal 86 and seal 81A which engage first housing part 12 as illustrated in FIG. 20 so that a flow path via the arrow is provided between the secondary pressure chamber 32 and a secondary outlet port 34.

By means of the two die-cast housing parts 12 and 14, master cylinder 10 provides fluid flow paths by means of the first and second interface members 80 and 90 which are layers of plastic and provide appropriate interfacing between the housing parts. The housing parts 12 and 14 are connected together, sandwiching the interface members in between, via the self-threading screws 100. All of the sealing within the master cylinder is accomplished via the insert molding of seals onto the interface members 80, 90 and rear land 70. This provides the major advantages of the elimination of parts and preventing the occurrence of mis-assembling parts. During the assembly operation, the master cylinder would be held in an assembled configuration by means of a clamping fixture that holds the interface members together so that they are sandwiched along with the sleeve and primary land member between the first and second housing parts. The clamp load upon the housing parts may be toleranced to provide a load that was previously supplied by torquing the threaded end cap into the threaded housing of the master cylinder. However, the clamp load via the fixture can be controlled to a much tighter tolerance because the thread friction between the previous end cap and threaded housing is eliminated. With the assembly clamped in place, the self-threading screws are screwed into the associated housing openings to fix the housing parts together. The screws are self-taping which results in a locking of the two housings at the clamp load set by the fixture. The screws may have coarse thread size to accommodate misalignment of the die-cast holes. The interface members 80 and 90 are the means which provide the communication paths to the reservoir ports and outlet ports. This eliminates the radial porting paths that were previously drilled through the die-cast structures and which could expose or open pores in the master cylinder housing. The outlet ports in the first housing part are directed forwardly so that the communication hole of each outlet port is cast with only flash that separated the two halves of the die having to be removed during the trimming operation. Virtually all of the seal fits are designed with interference in the axial direction, thereby utilizing the significantly smaller nominal dimensions and smaller tolerances which are not present with the conventional diametric dimensioning. This also eliminates the detrimental effects of an out-of-round and eccentric condition that is critical to the previous design. The reservoir ports are incorporated into the second interface member 90 and are directed horizontally toward the rear wall member 50. The reservoir is trapped in position between the interface members and front housing part on one side and the wall member on the other side when the master cylinder is assembled to a vacuum booster. The pumping function of a combined pumping and pressurization function of the master cylinder is separated from the previous location at the rear land member and is now located at the interface member region.

The master cylinder of the present invention provides the above advantages in addition to eliminating the previous side porting orientation for the outlet ports which required a very narrow master cylinder in order to allow access for the tools of the brake line tube nuts. The front oriented outlet ports also enable an improved location and orientation of a fluid level indicator, in addition to the elimination of a wire retainer for holding the reservoir to the master cylinder housing. The diecast housing assembly procedure is improved so that the casting operation is improved and a larger number of cavities may be provided. The previously used seals are sensitive to diametric fit, roundness, and concentricity of several components. These parameters tend to be difficult to hold since the diameters are large. This is also eliminated.

The present invention can eliminate or provide the following which is utilized in prior recessed cartridge master cylinder constructions: 1. The drilling of communications holes for the communication of reservoir and outlet ports; 2. Reaming and tapping of large diameter threads which attach the front and rear housing parts; 3. The sensitivity to torque when assembling the first housing part to the second housing part; 4. The assembly of all seals since all the seals in the present master cylinder are insert molded to the interface members 80, 90 and the primary land 70; 5. The sensitivity of the seals to roundness of the sleeve for sealing; 6. The sensitivity of the seals to misassembly due to "foldover" when the pumping seals enter the sleeve or housing; 7. The wire retainer for the reservoir due to the horizontal orientation of the reservoir ports and the reservoir's entrapment between the master cylinder port and the wall member; 8. The telescoping of the two front and rear die-cast housings; 9. Die-cast material that encompassed the non-pressure sections of the master cylinder and thereby minimize material; 10. Multi-directional pulls for the die-cast housing which limited the die to four cavities; the present invention providing for the use of unidirectional die motion, thereby permitting a higher number of cavities, and improved dimensional control and lower cost; 11. All machining operations on the second housing part; 12. Access and fit problems for assembly of brake lines because all of the outlet ports are now readily accessible at the front of the master cylinder; 13. The reservoir packaging via expandability of the reservoir by several inches to the outboard side of the housing due to the relocation of the outlet ports; 14. The sealability of the pistons via the complete separation of the seal to the piston from the seal to the housing (secondary seal) or the seal to the sleeve (primary seal), i.e. the inner and outer seals function independently; 15. The compression loading of plastic components in the prior assembly; 16. An improved reduction in parts by approximately one third. 17. Machining operations reduced just to the first housing part in order to tap the threads for the outlet ports; 18. All seals automatically oriented via insert molding; and 19. The assembly can be completely tested in the clamped position to detect any defects so that proper corrective action can be taken prior to fixing together the components.

Thus, the master cylinder of the present invention provides a significant step forward in the ease of assembly, manufacturing, and reduction of manufacturing costs for a recessed cartridge type of master cylinder.

I claim:

1. A master cylinder, comprising a first housing part and a second housing part and having an end of one part received at the end of the other part so that the parts define therebetween an interior opening comprising a bore, a sleeve member received within said second housing part, first piston means slideably received within an end opening of said second part, second piston means received within said bore and biased by first resilient means, second resilient means biasing the first piston means, a reservoir communicating with said bore, and first and second interface members captured between said first and second parts, the interface members having sealing members molded thereupon to provide fluid flow paths between the reservoir and bore and between said bore and fluid outlets.

2. The master cylinder in accordance with claim 1, wherein the fluid outlets are disposed in a direction that is substantially parallel to a longitudinal axis of said bore.

3. The master cylinder in accordance with claim 1, wherein said first and second parts are connected together by means of connection members which capture the interface members between the first and second parts.

4. The master cylinder in accordance with claim 3, wherein the connection members comprise self-threading screws.

5. The master cylinder in accordance with claim 1, wherein each interface member contains sealing members that are insert molded on each side thereof.

6. The master cylinder in accordance with claim 1, wherein the sealing members permit fluid flow to a longitudinal opening extending between said sleeve member and said second part in order to provide fluid for a primary chamber of said master cylinder.

7. The master cylinder in accordance with claim 1, wherein said master cylinder is connected with wall means such that a rear portion of said reservoir abuts the wall means so that the reservoir is captured between said wall means and said interface members and first part.

8. The master cylinder in accordance with claim 7, wherein said master cylinder is attached to said wall means by way of screw and nut means.

9. The master cylinder in accordance with claim 1, wherein said second interface member includes an axially extending boss which extends through a corresponding opening in said first interface member in order to abut a sealing member opening on an opposite side of said first interface member.

10. The master cylinder in accordance with claim 9, wherein the sealing member opening is a slot in a recessed seal pad.

11. The master cylinder in accordance with claim 1, wherein sealing means is disposed at the end opening in order to prevent fluid from flowing from a pressure chamber to an exterior of said master cylinder.

12. The master cylinder in accordance with claim 1, wherein the sleeve member has an extension engaged by a flexible thinned seal area.

13. The master cylinder in accordance with claim 1, wherein the interface members have through openings for compensation, pumping, and outlet fluid flow.

14. The master cylinder in accordance with claim 1, wherein a sealing member on one of said interface members engages sealingly a reservoir port.

15. The master cylinder in accordance with claim 1, wherein the interface members provide thereat fluid pumping functions for both primary and secondary pressure chambers of the master cylinder.

16. A master cylinder, comprising a first housing part and a second housing part and having an end of one part received at the end of the other part so that the parts define therebetween an interior opening comprising a bore, a sleeve member received within said second housing part, first piston means slideably received within an end opening of said second part, second piston means received within said bore and biased by first resilient means, second resilient means disposed between said pistons, a reservoir communicating with said bore, and first and second interface members captured between said first and second parts, the interface members having sealing members attached thereto to provide fluid flow paths between the reservoir and bore and between said bore and fluid outlets, through openings for compensation, pumping, and outlet fluid flow in the interface members, and a sealing member on one of said interface members engaging sealingly a reservoir port.

17. The master cylinder in accordance with claim 16, wherein the fluid outlets are disposed in a direction that is substantially parallel to a longitudinal axis of said bore.

18. The master cylinder in accordance with claim 16, wherein each interface member contains sealing members that are insert molded on each side thereof.

19. The master cylinder in accordance with claim 16, wherein the sealing members permit fluid flow to a longitudinal opening extending between said sleeve member and said second part in order to provide fluid for a primary chamber of said master cylinder.

20. The master cylinder in accordance with claim 16, wherein said master cylinder is connected with wall means such that a rear portion of said reservoir abuts the wall means so that the reservoir is captured between said wall means and said interface members and first part.

21. The master cylinder in accordance with claim 20, wherein the wall means comprises part of a brake booster.

22. The master cylinder in accordance with claim 16, wherein the interface members provide thereat fluid pumping functions for both primary and secondary pressure chambers of the master cylinder.

* * * * *